(12) United States Patent
Henningsson et al.

(10) Patent No.: US 6,670,869 B2
(45) Date of Patent: Dec. 30, 2003

(54) BEARING DEVICE

(75) Inventors: Uno Henningsson, Haninge (SE); Christer Ahlberg, Kolbäck (SE); Hannes Medelius, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/982,031

(22) Filed: Oct. 19, 2001

(65) Prior Publication Data

US 2002/0085777 A1 Jul. 4, 2002

(30) Foreign Application Priority Data

Oct. 20, 2000 (SE) ................................. 0003802

(51) Int. Cl.$^7$ .............................................. H01B 7/10
(52) U.S. Cl. .................... 333/219.1; 333/231; 333/232; 333/235
(58) Field of Search ................. 333/202, 212, 333/219, 230, 235, 219.1, 231, 232

(56) References Cited

U.S. PATENT DOCUMENTS

| | | | | |
|---|---|---|---|---|
| 3,564,340 A | * | 2/1971 | Bahr ...................... 315/39.61 |
| 3,715,690 A | * | 2/1973 | Young et al. .............. 333/17.1 |
| 4,477,788 A | * | 10/1984 | Collinet et al. ............. 333/235 |
| 4,500,859 A | * | 2/1985 | Ren et al. .................... 333/208 |
| 4,728,913 A | | 3/1988 | Ishikawa et al. |
| 4,810,984 A | * | 3/1989 | Arnold et al. ............... 333/202 |
| 5,049,842 A | * | 9/1991 | Ishikawa et al. ............ 333/235 |
| 5,235,294 A | * | 8/1993 | Ishikawa et al. ........... 333/17.1 |
| 5,612,655 A | * | 3/1997 | Stronks et al. .............. 333/202 |
| 5,712,606 A | * | 1/1998 | Sarkka .................... 333/219.1 |
| 5,818,314 A | * | 10/1998 | Baker .......................... 333/226 |
| 5,843,871 A | * | 12/1998 | Beik et al. .................. 505/210 |
| 5,859,576 A | * | 1/1999 | Winandy ..................... 333/232 |
| 6,107,900 A | * | 8/2000 | Satoh et al. ............. 333/219.1 |
| 6,114,928 A | * | 9/2000 | Smith ......................... 333/202 |
| 6,118,356 A | * | 9/2000 | Loi et al. .................... 333/209 |
| 6,255,922 B1 | * | 7/2001 | Malmstrom et al. ..... 333/219.1 |
| 6,496,089 B1 | * | 12/2002 | Ang. kesson et al. ... 333/219.1 |

FOREIGN PATENT DOCUMENTS

| | | |
|---|---|---|
| EP | 0558850 A2 | 9/1993 |
| JP | 409214216 A * | 8/1997 |
| WO | WO98/56062 | 12/1998 |

\* cited by examiner

*Primary Examiner*—William C. Joyce
*Assistant Examiner*—Julie K. Smith

(57) ABSTRACT

The invention relates to a bearing device for a spindle, for example, for a dielectric tuner (13) in a cavity filter for electromagnetic waves. The bearing device comprises at least two sprung tongues (27), each of which has a stud (28) with a partially spherical free end, where at least two of the free ends are in contact with a sliding surface (21, 44). The invention also relates to a cavity filter and a method for assembling the cavity filter.

9 Claims, 4 Drawing Sheets

US 6,670,869 B2

BEARING DEVICE

TECHNICAL FIELD OF THE INVENTION

The present invention relates in general to a bearing device for a spindle, for example, for a dielectric tuner in a cavity filter. The invention also relates to a cavity filter and a method for assembling the cavity filter.

DESCRIPTION OF RELATED TECHNOLOGY

In, for example, radio base stations, cavity filters are used for filtering, for example, microwaves of particular frequencies from different transmitters to a shared antenna. A hollow dielectric body, a so-called resonator, is often used in a cavity filter to produce resonance in a cavity at a particular frequency. In order to change the resonance frequency, a dielectric tuner is used in the form of a body that interacts with the resonator.

U.S. Pat. No. 4,728,913, which is hereby incorporated as a reference, shows a cavity with a hollow dielectric resonator described above, and a dielectric tuner that is fixed on a spindle. By turning the spindle, the tuner can be inserted into and withdrawn from the hole in the resonator in order in this way to change the effective dielectric constant and thereby the resonance frequency. This is described in detail in the abovementioned document, and therefore does not need to be described in greater detail. The spindle for the tuner is mounted in two places through two bushes with through-holes.

During manufacture, tolerances automatically arise between the spindle and the bushes. The tolerances can lead to problems in the form of unwanted radial play that makes the construction unstable and sensitive to vibrations. The play also means that an accurate setting of required resonance frequency is difficult and time-consuming. In addition, the device in the abovementioned document does not comprise any motor for moving the tuner. Accordingly, no automatic control of the position of the tuner can be achieved, which is a great disadvantage when, for example, there is a need to jump between different frequencies in base stations for cellular telephones.

SUMMARY

A first general aim of the present invention is to achieve a more stable mounting of a spindle using a sliding bearing, such as for a spindle that is fixed in a bearing in a cavity filter.

A second aim is to make possible improved accuracy of automatic setting of the resonance frequency in a cavity of a cavity filter.

In the description and the patent claims relating to the present invention, the term "spindle" is not only the general term for a spindle, that is an element that is designed to rotate or support another element that is designed to rotate, but also relates to an element that is mounted in such a way that it can be moved axially.

The present invention relates to a bearing device for a spindle, for example for a dielectric tuner in a cavity filter for electromagnetic waves, where the bearing device comprises at least two sprung tongues, each of which has a stud with a partially spherical free end, where at least two of the free ends are in contact with a sliding surface. By this means, tolerance play is avoided between the spindle and the sliding surface. As the studs are partially spherical, they resemble a ball, which, when the stud makes contact with the sliding surface, provides a desirable minimal contact surface between the stud and the sliding surface, while at the same time allowing for a certain deviation of the spindle from an ideal contact position with the sliding surface without tolerance play arising.

The tongues are preferably an integral part of the spindle and for manufacturing reasons the studs point outwards from the spindle. In this embodiment, the tongues extend essentially parallel to an axis of symmetry of the spindle and are sprung essentially radially inwards. In addition, the studs extend essentially at right angles out from the spindle. As a result of this, a spindle can be manufactured with a distance between the free ends of two studs that is larger than the corresponding dimension for a sliding bearing and yet still be able to be inserted into the sliding bearing. This greater distance is even desirable, as it guarantees that no play arises between the sliding bearing and the spindle in normal use.

In a second embodiment, the tongues are a part of a bearing rod. In addition, the studs point outwards from the bearing rod and the spindle comprises the sliding surface.

In a third embodiment, the sliding surface is an external part of the spindle and a bearing sleeve for receiving the spindle comprises the tongues with the studs, that point essentially radially inwards towards the sliding surface.

For use in, for example, a cavity filter in the form of a so-called ceramic filter, the spindle is hollow and is made of dielectric material, such as plastic, with or without some anti-friction material such as PTFE.

In order to be able to put and, if required, fix a hollow element, such as a hollow tuner, onto the spindle, the spindle comprises a first spindle part with a first section of internal threads and a second spindle part with external threads that correspond to the first section of internal threads.

The tongues are preferably arranged at a first end of the spindle. A second section of internal threads is arranged at a second end of the spindle, where the second section of internal threads is designed to be brought into engagement with a ball screw device. By means of the ball screw device, the radial play is minimized between the spindle and, for example, a motor designed for moving the spindle.

In addition, the second end of the spindle can have an outer contour that is in the shape of a regular hexagon in order to make easier the reception of a tool that helps to screw the spindle onto the ball screw device.

The number of tongues is preferably four and the spindle comprises a reinforcing element that is arranged between at least two of the tongues. By this means, two of the tongues can be sprung in order to take up the tolerance play between the spindle and the sliding bearing, while the other two tongues considerably reduce the size of unwanted spindle vibrations when the spindle is subjected to vibrations from some external source.

In a first alternative of the first embodiment, the bearing device comprises a bearing in the form of a sleeve, where the sliding surface is arranged internally in the bearing. By this means, the manufacture of the sliding surface is made easier in comparison to the sliding surface being integrated into a large and unwieldy component.

In order to be able to make contact with, for example, a wall or a casing, such as a first casing element for the cavity, the bearing comprises a collar with a ring-shaped contact surface. The bearing consists of at least one dielectric material when it is to be used in association with a cavity filter.

In a second alternative of the first embodiment, the sliding surface is integrated with the first casing element and defines a bottom hole in the first casing element. By this means, no assembly of a bearing needs to be carried out.

The sliding surface has suitably an essentially star-shaped cross-sectional contour, where the cross-sectional contour is in the shape of a symmetrical star with eight points, where the sliding surface comprises two separate surface sections in each point, which surface sections for each of the points are in contact with a respective part of one of the studs. Alternatively, the sliding surface can have an essentially square cross-sectional contour with the same effect. Both the star-shape and the square cross-sectional contour prevent the spindle rotating around its own axis of symmetry when the spindle is inserted in the bearing, if the bearing cannot be rotated.

The bearing device allows the spindle to be inserted essentially axially along an axis of symmetry of the sliding surface, while at the same time the free end of the spindle which is at least partially spherical, together with the sliding surface, allows an angle of up to 20° between the axis of symmetry of the sliding surface and a longitudinal axis of the spindle, without contact being lost between each stud and the sliding surface. By this means, the assembly of the spindle in the sliding bearing is made even easier. In order to be able more easily to allow insertion at an angle and to improve the sliding properties of the studs and their contact with the sliding surface, the free end of each stud is essentially hemispherical. In order, in addition, to allow even greater angles between the spindle and the sliding surface, the free end of each stud has a larger spherical surface than a hemispherical surface with the same radius as the free end.

In addition, the invention relates to a cavity filter for electromagnetic waves. The cavity filter comprises:

a first casing element;

a second casing element, which, together with the first casing element, defines a cavity;

a tuner of dielectric material;

a resonator of dielectric material which is provided with a through-hole to allow the tuner to move in and out of the resonator;

a tube-shaped first support of dielectric material on a first side of the resonator;

a movable dielectric spindle, on which the tuner is arranged;

where the spindle is mounted by means of at least two sprung tongues, each of which has a stud with a free end that is at least partially spherical, where at least two of the free ends are in contact with a sliding surface. By this means, tolerance play is avoided between the spindle and the sliding surface. As the studs are partially spherical, they resemble a ball, which when the stud is in contact with the sliding surface provides a desirable minimal contact surface between the stud and the sliding surface while at the same time allowing a certain deviation of the spindle from an ideal contact position in relation to the sliding surface without a tolerance play arising.

The cavity filter preferably comprises a tube-shaped second support of dielectric material on a second side of the resonator. By this means, a cavity filter is achieved that provides faster and simpler assembly and disassembly of the cavity filter.

It is a great advantage if the tuner is essentially circular and tube-shaped with an external diameter that is smaller than a diameter of an essentially circular opening in the second casing element. By this means, the tuner or spindle to which the tuner is attached can be replaced without the second casing element needing to be removed.

The cavity filter suitably comprises a motor mounted on the second casing element, such as a stepping motor, and a ball screw device arranged between the motor and the spindle for transferring a rotational movement from the motor into a longitudinal movement of the spindle. By means of the motor, the tuning device can be set automatically when the motor is connected to a control unit. By means of the ball screw, the radial play that has arisen as a result of tolerances between the spindle and the motor for moving the tuner is reduced. Instead of a ball screw device and a stepping motor, a linear motor can be used.

According to a first embodiment of the cavity filter, the first casing element has a bottom hole and a step to receive a bearing in the form of a hollow sleeve that comprises the sliding surface. In a second embodiment, the sliding surface is an integral surface on the first casing element. In a third embodiment, the first casing element has a bottom hole for receiving a bearing rod that comprises the tongues, and the spindle comprises the sliding surface.

The invention also relates to a method for assembling the cavity filter. The method comprises the steps of:

arranging a sliding surface in a bottom hole in a first casing element;

arranging a dielectric first support against a step in the bottom hole;

arranging a dielectric resonator above the first support;

arranging a dielectric second support above the resonator;

fixing a second casing element to the first casing element in such a way that the second casing element is in contact with the second support;

inserting a spindle with a tuner through an opening in the second casing element after the second casing element has been fixed and thereafter bringing the spindle into contact with the sliding surface.

By this means, tolerance play is avoided between the spindle and the sliding surface. In addition, a quick and simple assembly of the cavity filter is achieved, that afterwards also makes possible quick disassembly of the cavity filter.

The method preferably comprises the steps of arranging a ball screw device on both the spindle and a motor, before the spindle is inserted through the opening, and arranging a bearing in the bottom hole, where the bearing comprises the sliding surface. By this means, radial play arising through tolerances between the spindle and the motor is reduced.

Alternatively, a linear motor is arranged directly on the spindle, which provides the same effect as the ball screw device.

BRIEF DESCRIPTION OF THE FIGURES

The aims, advantages and effects, and the characteristics of the present invention will be understood more easily as a result of the following detailed description of embodiments, where the description is to be read in conjunction with the enclosed drawings, in which.

DETAILED DESCRIPTION OF EMBODIMENTS

Figure 1:
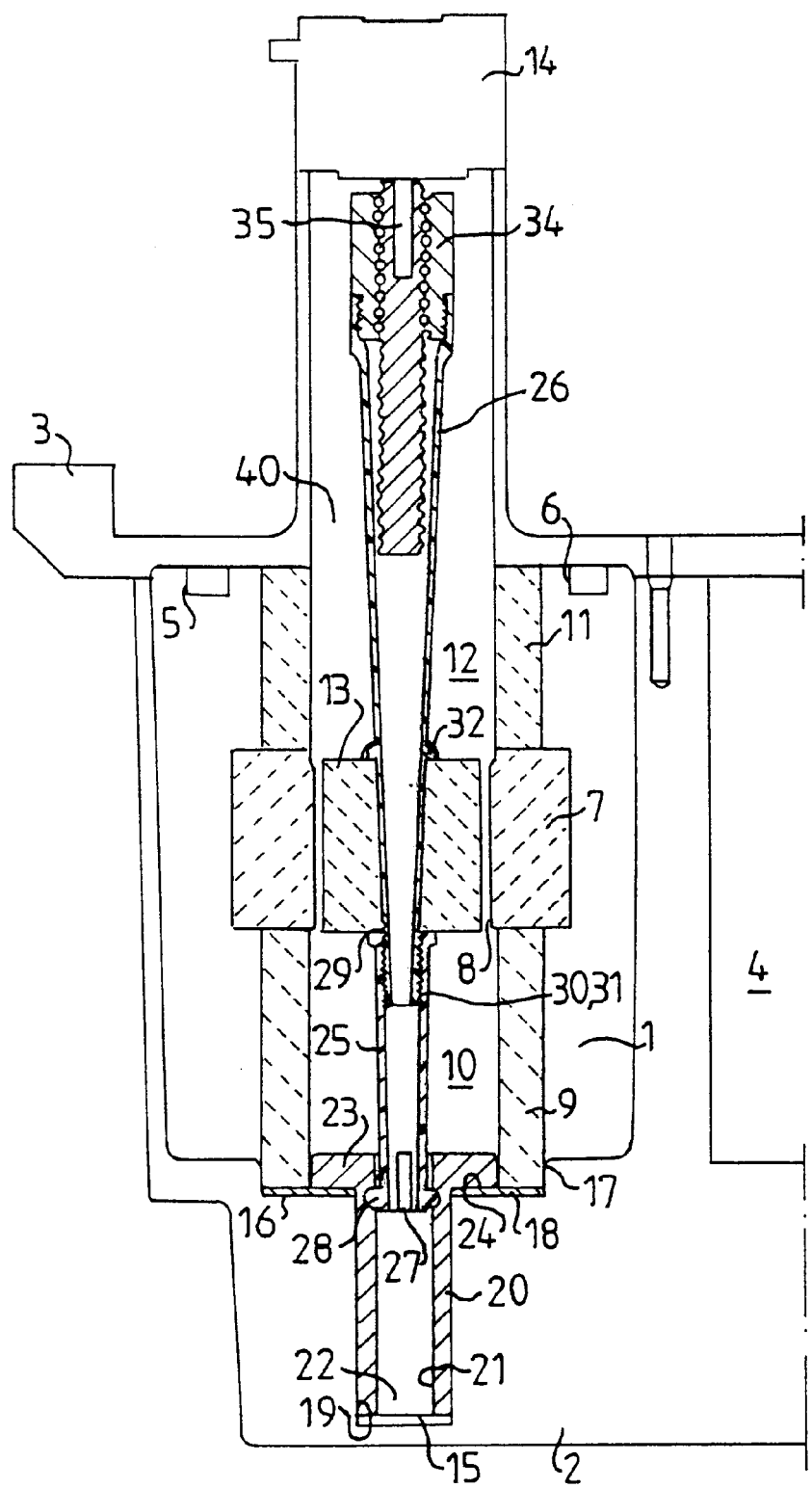
FIG. 1 shows a cross-sectional view of a cavity filter with a preferred embodiment of the invention.

While the invention covers various modifications and alternative designs, various embodiments of the invention are shown in the drawings and will be described in detail below. It should, however, be understood that the special description and the drawings are not intended to limit the invention to the specific forms shown. On the contrary, it is intended that the scope of the invention to which the application refers comprises all modifications and alternative designs thereof that fall within the concept and scope of the invention as expressed in the attached claims.

FIG. 1 shows a cross-section of a preferred embodiment of the invention. It shows a cavity filter in the form of a so-called ceramic filter with a bearing device according to a first embodiment. The cavity filter comprises a cavity 1 for electromagnetic waves, such as microwaves, which cavity 1 is principally defined by a first casing element in the form of a casing 2 and a second casing element in the form of a cover 3. The cavity 1 is here essentially parallelepiped, but can also be cylindrical. Both the casing 2 and the cover 3 can be designed for only one cavity 1, or as indicated in the right-hand part of FIG. 2, [sic] can house one or more additional cavities 4 for more cavity filters. An input loop 5 and an output loop 6 for supplying and tapping off respectively particular frequencies are inserted essentially vertically through holes (not shown) in the cover 3 and at least partially into the cavity 1. A cylindrical and ceramic resonator 7 with a concentric through-hole 8 is placed inside the cavity 1, by the resonator 7 being fixed by a cylindrical and ceramic first support 9 with a concentric hole 10 below the resonator 7, and a cylindrical and ceramic second support 11 with a concentric hole 12 above the resonator 7. The supports 9 and 11, can be made of, for example, aluminium oxide or quartz glass, and the supports 9, 11 are not only designed to fix the resonator 7, but are also used to conduct heat away from the resonator 7. The holes 8, 10, 12 in the resonator 7 and the supports 9, 11 respectively are cylindrical and concentric in relation to each other, in order to allow a tuner 13 to move vertically in and out of the hole 8 in the resonator by means of a preferably hollow spindle of dielectric material, such as plastic or ceramic, and a motor 14 in the form of stepping motor connected to the spindle. The tuner 13 is made of dielectric material, such as ceramic with a high dielectric constant, and upon insertion into the hole 8 in the resonator 7, the tuner 11 [sic] changes the resonance frequency of the cavity filter. In this way, the resonance frequency can be changed without any jump between different frequencies. The lowest resonance frequency is attained when as much as possible of the mass of the tuner 13 is inserted into the hole 8 in the resonator 7.

The casing 2 has a bottom with an essentially vertical bottom hole 15 with a circular inner section and a circular outer section. The diameter of the outer section is larger than the diameter of the inner section. The transition between the sections takes place relatively abruptly, so that an essentially flat, circular ring-shaped step 16 is created that is horizontal in FIG. 1. The surface of the casing 2 that defines the outer contour of the outer section constitutes a circular ring-shaped first guide surface 17 essentially at right angles to the step 16. A spring washer 18 is in contact with at least the step 16 and the first support 9 is placed above the spring washer 18. The diameter of the first guide surface 17 corresponds essentially to the external circumference of the spring washer 18 and of the first support, so that the first guide surface 17 acts as a guide for the spring washer 18 and the first support 9 relative to the casing 2 during assembly and prevents radial movement of the spring washer 18 and the first support 9 after assembly. The surface of the casing 2 that defines the cylindrical surface of the inner section of the bottom hole 15 that is vertical in FIG. 1 constitutes a second guide surface 19 for a bearing 20 in the form of a sleeve of metal or dielectric material. The bearing is preferably provided with an inner sliding surface 21 that defines a concentric through-hole 22 and a collar 23 at a first end of the bearing 20. The collar has an essentially flat and ring-shaped contact surface 24, which has a perpendicular pointing parallel to the longitudinal axis of the bearing 20 towards a second end of the bearing. The contact surface 24 is here in contact with the spring washer 18, but the spring washer can also be provided with such a large through-hole that the contact surface 24 is in contact with a part of the step 16.

The spindle for the tuner 13 consists of two hollow parts; a lower, first spindle part 25 and an upper, second spindle part 26. The first spindle part 25 is slotted at a lower end so that four tongues 27 are formed at the lower end, extending essentially along the first spindle part 25. Each of these tongues 27 is sprung radially inwards towards the axis of symmetry of the first spindle part and is provided with a radially-protruding stud 28 that is in contact with the sliding surface 21. The studs 28 are preferably integral with the free end of the tongues 27. The free end of each stud 28 is essentially hemispherical in shape, but can, for example, be in the shape of a larger or smaller part of a corresponding sphere. The spherical shape is intended to resemble that of a ball, which provides an optimized contact surface against the sliding surface 21, with a design of the sliding surface 21 that is described later. The upper end of the first spindle part 25 comprises a first flange with a flat first stop surface 29 facing upwards, which is in contact with a lower side of the tuner 13. The upper end of the first spindle part 25 also comprises internal threads 30 that fit external threads 31 on a lower end of the second spindle part 26. In order to fix the tuner 13 to the spindle, the second spindle part 26 is provided with a second flange that has a flat second stop surface 32 facing downwards, which is in contact with an upper side of the tuner 13. By inserting the lower end of the second spindle part 26 through a concentric through-hole in the tuner 13 and then screwing on the first spindle part 25, the tuner 13 is clamped between the first stop surface and the second stop surface. An upper end of the second spindle part comprises internal threads 33 (see FIG. 2) that engage with external threads on a nut element of a ball screw device 34 that is fixed on an outgoing shaft of the motor. By means of the ball screw device 34, the spindle can be moved axially in and out of the hole 8 in the resonator 7, while at the same time there is an attempt to reduce the radial play between the spindle and the outgoing shaft 35 of the motor 14 by means of the ball screw.

Figure 2:
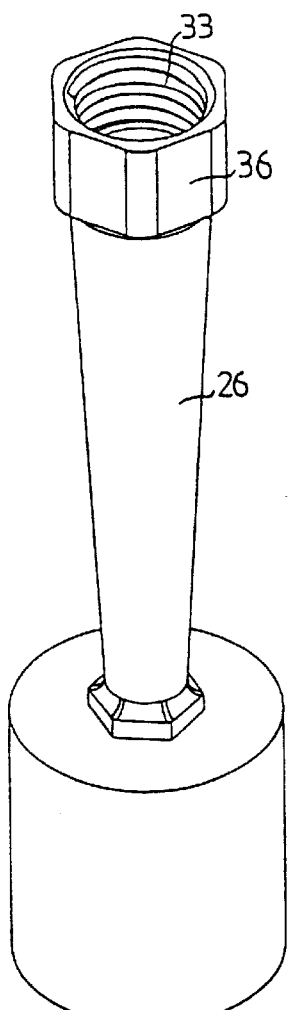
FIG. 2 shows a perspective view of a preferred spindle with a tuner.

As shown in FIG. 2, the upper end of the second spindle part 26 has an outer contour with six flat surfaces 36 so that the outer contour corresponds to the outer contour of a conventional hexagonal nut. By this means, a reliable and precisely set connection can be made between the spindle and the ball screw device 34 using a spanner.

Figure 3:
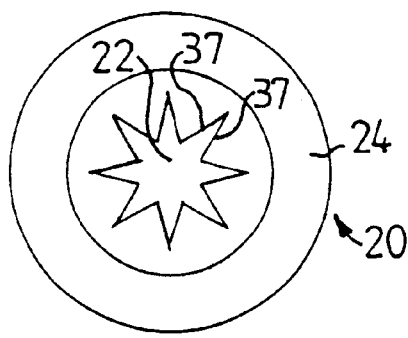
FIG. 3 shows a first embodiment of a sleeve viewed from below.

The sliding surface 21 of the bearing 20, which is shown in FIG. 3, has a regular star-shaped profile with eight points. At each point, the sliding surface 21 comprises two surface sections 37 on each side of the tip of the point. It is these surface sections 37 that come into contact with the hemispherical free end of the studs 28 and mean that the spindle can move along its own axis of symmetry. The star-shape of the sliding surface means, however, that the spindle cannot be rotated around its axis of symmetry as the studs 28 are in contact with the surface sections 37.

Figure 4:
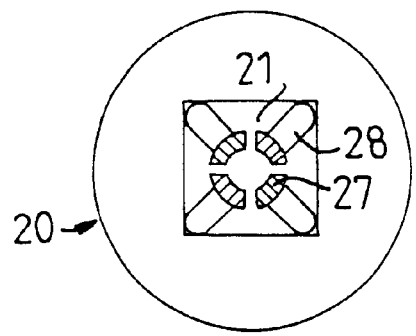
FIG. 4 shows a second embodiment of the sleeve viewed from above.

FIG. 4 shows a second embodiment of the bearing 20 with the studs 28 inserted in the through-hole 22 of the bearing 20. The first spindle part 25 has been sectioned immediately above the studs in order to provide a better illustration of how the tongues 27 with their studs 28 are located in relation to the sliding surface 21, which here has a square profile for contact with the studs 28. As in the first embodiment of the bearing 20, the hemispherical end of each of the studs 28 is in contact with two separate surface sections of the sliding surface 21.

Figure 5:
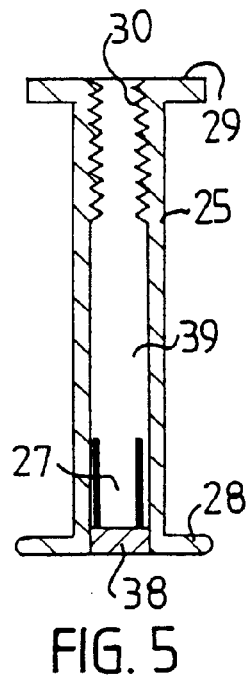
FIG. 5 shows a cross-section of a first spindle part with a reinforcing element.

FIG. 5 shows a cross-section of the first spindle part 25. As an optional component, a reinforcing element 38 has here been inserted in the hole 39 in the first spindle part 25 at the end provided with the tongues. The reinforcing element 38 is inserted between two opposite tongues 27 in order to prevent these being able to be pressed radially inwards. As these two opposite tongues 27 cannot spring inwards, during manufacture of the first spindle part 25 and the bearing 20 as small a tolerance as possible between the surface section 37 of the sliding surface and the studs of these opposite tongues is aimed for. The two tongues that are allowed to spring inwards are intended to take up any tolerance play between the studs 28 and the sliding surface 21, that is to ensure that there is no play at all. By ensuring that two of the tongues are not sprung, instead of allowing all the tongues to be sprung, a significant reduction is achieved in the size of the vibrations that arise in the spindle in the event of external vibrations that affect the cavity filter. The sprung tongues 27, together with the shape of the sliding surface 21, ensure that radial movements between the sliding sleeve and the spindle are counteracted.

Another way of eliminating the tolerance play between the studs 28 and the sliding surface 21, is to make the dimensions of the studs 28 so large that all the tongues 27 must be pressed in slightly radially towards the axis of symmetry of the spindle in order to be able to insert the spindle into the through-hole 22 in the bearing 20. This variant does not, however, exclude the use of the reinforcing element 38 in FIG. 5.

Figure 6:
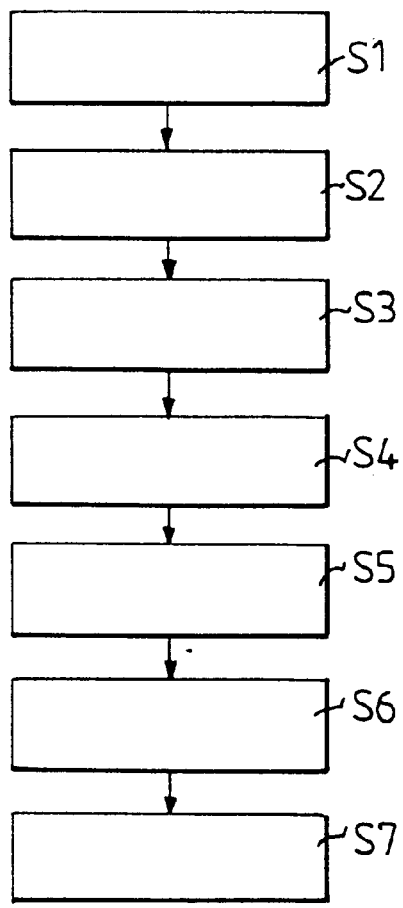
FIG. 6 shows a flow chart for a method according to the invention.

An assembly method for the cavity filter will now be described with reference to the flow chart in FIG. 6. In step S1, the spring washer 18 and the bearing 20 are placed in the bottom hole 15. The fixing of the bearing 20 in the bottom hole 15 is carried out by a press fit. In step S2, the first support 9 is installed above the spring washer 18 using the first guide surface 17. Thereafter, the resonator 7 and the second support 11 are installed. In order to fix the resonator 7 to the support, for example glue can be used. In step S3, the cover 3 is fixed to the casing 2 using fixing elements that are screwed into corresponding threaded holes in the cover 3 and the casing 2. In step S4, the tuner 13 is fixed between the first and the second spindle parts, 25 and 26 respectively, in the way described above. Thereafter, in step S5, the ball screw device 34 is attached to the motor 14 and the spindle is screwed onto the ball screw device 34. Then, in step S6, the spindle with the tuner 13 is inserted into the cavity 1 so that the studs 28 come into contact with the sliding surface 21. In order to be able to insert the tuner 13 even if the cover 3 is fixed to the casing 2, the cover 3 is provided with a circular opening 40 with a diameter that is larger than the external diameter of the tuner 13. The insertion of the spindle can be carried out with relatively low precision compared to conventional spindles that fit conventional sliding bearings. Low precision requirements are of course good for speeding up the assembly. The low precision requirements are due to the hemispherical surfaces of the studs 28 and the fact that at least some of the tongues 27 are sprung, which means that the fastening of the spindle in the bearing 20 allows the axis of symmetry of the spindle to have an angular deviation from the axis of symmetry of the bearing 20 of up to 20° without any tolerance play arising between the sliding surface 21 and the studs 28. It is thus possible to insert the spindle in the bearing 20 at a slightly oblique angle without the required bearing characteristics being changed. Finally, in step S7, the motor is fixed to the cover 3 and thereby the required suspension of the tuner 13 has been achieved.

Figure 7:
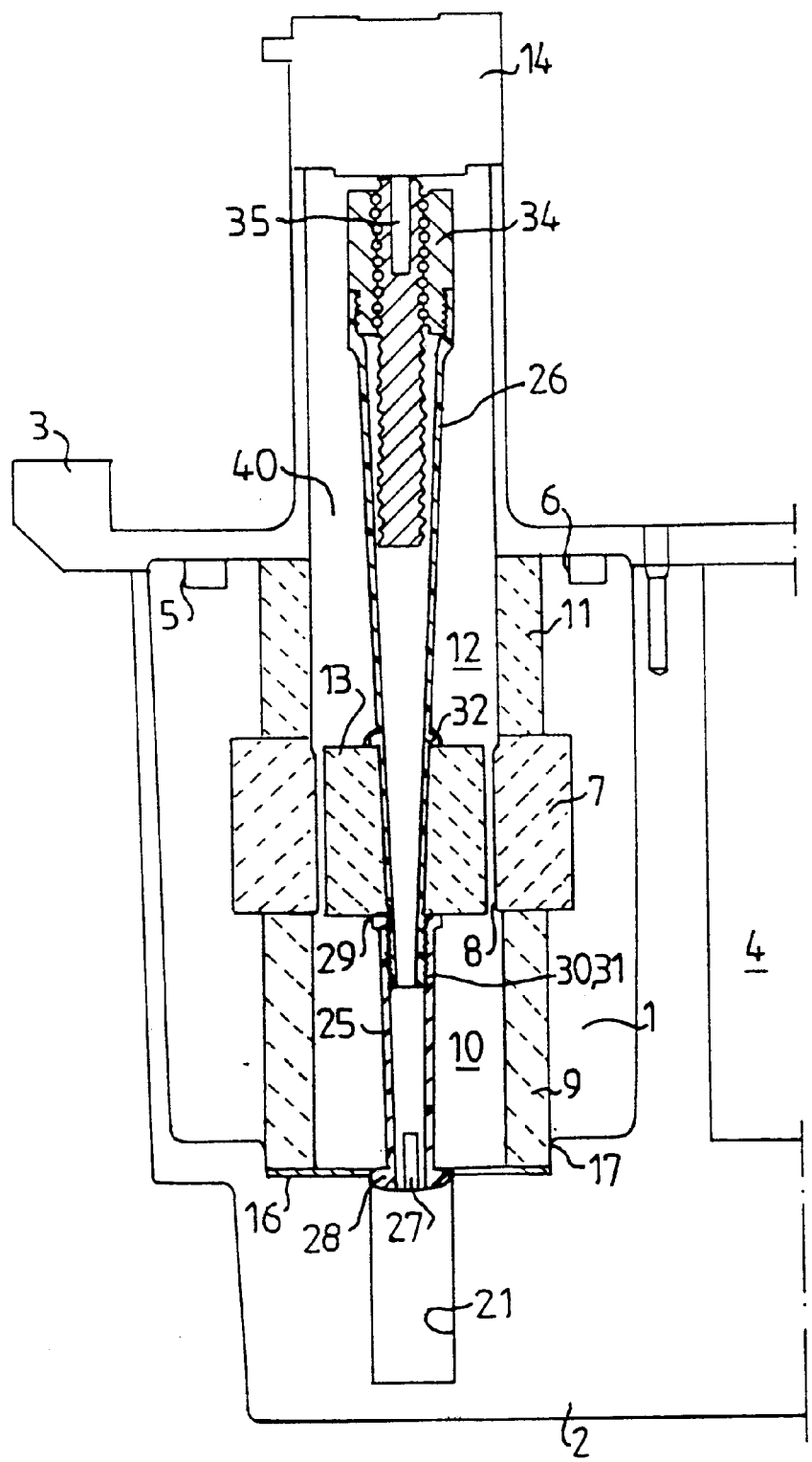
FIG. 7 shows the cavity filter with an alternative embodiment of a bearing device.

FIG. 7 shows a second embodiment of a cavity filter with a bearing device according to the invention. In this embodiment, the sliding surface 21, which is exemplified in FIGS. 4 and 4, [sic] is integral with the casing 2, that is the sleeve is not required here. If so required, the sliding surface 21 can be treated with some anti-friction material such as PTFE.

Figure 8:
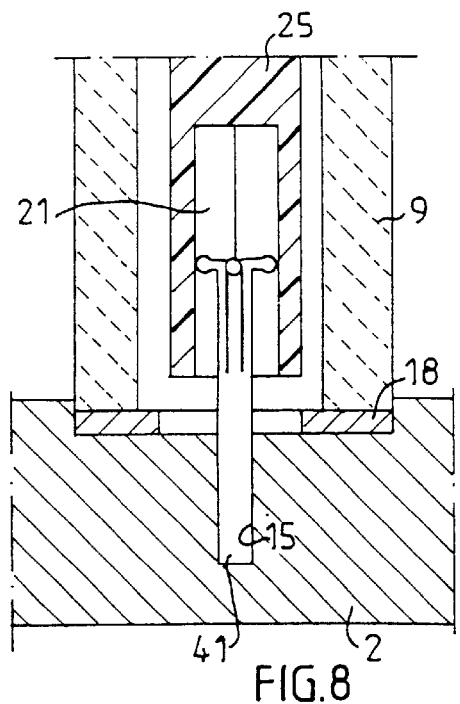
FIG. 8 shows a part of a third embodiment of the bearing device comprised in a cavity filter.

FIG. 8 shows a partially sectioned view of a third embodiment of the cavity filter with a bearing device according to a second embodiment. Here the bottom hole 15 in the casing 2 is arranged to receive a bearing rod 41, which is attached by means of, for example, a press fit or glue. The bearing rod, which is not sectioned here, comprises the four tongues 27 provided with studs, while the first spindle part 25 comprises the sliding surface 21, which is here shown as a part of an internal square sliding surface that corresponds to the one in FIG. 4. The free ends of the four studs 28 have here a partially spherical area that is larger than the corresponding hemisphere, in order to be able to allow larger angular deviations between the bearing rod 41 and the first spindle part 25 without any tolerance play being created and reducing the ability of the first spindle part 25 to slide against the bearing rod 41.

Figure 9:
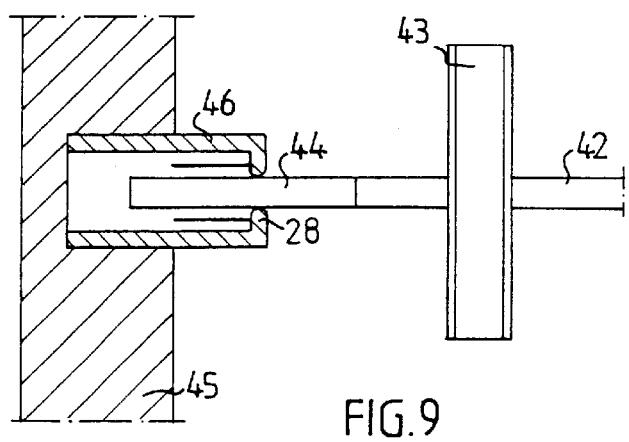
FIG. 9 shows a fourth embodiment of the bearing device.

FIG. 9 shows a third embodiment of the bearing device, here applied on a spindle 42, partially shown for the sake of clarity, for a roller 43 fixed axially on the spindle. The end of the spindle 42 shown has an external sliding surface 44 with a square profile. Alternatively, the end can have a star-shaped profile. The end is inserted in a bearing sleeve 46, shown here in section, fixed in a wall 45, which bearing sleeve has four tongues that have studs 28 arranged facing radially inwards, each with a hemispherical free end. Alternatively, the external sliding surface 44 and the tongues can change places so that the spindle has a hollow end provided with the tongues and the radially inwards-facing studs 28 for receiving a fixed rod with the external sliding surface 44.

Even though only two applications of a bearing device in a cavity filter have been shown here, it is to be understood that the bearing device can be used in any other suitable devices where there is a bearing with a sliding surface and a spindle/rod, where there is a desire to eliminate the radial tolerance play between these.

What is claimed is:

1. A cavity filter for electromagnetic waves, comprising:
   a first casing element;

a second casing element 43, which together with the first casing element defines a cavity;

a tuner of dielectric material;

a resonator of dielectric material which is provided with a through-hole to allow the tuner to move in and out of the resonator;

a tube-shaped first support of dielectric material on a first side of the resonator;

a movable dielectric spindle, on which the tuner is arranged;

where the spindle is mounted by means of at least two sprung tongues, each of which has a stud with an at least partially spherical free end, where at least two of the free ends are in contact with a sliding surface along which said spindle moves as said tuner moves in and out of said resonator.

2. A cavity filter according to claim 1, comprising a tube-shaped second support of dielectric material on a second side of the resonator.

3. A cavity filter according to claim 1, where the tuner is essentially circular and tube-shaped with an external diameter that is smaller than a diameter of an essentially circular opening in the second casing element.

4. A cavity filter according to claim 1, comprising a motor mounted on the second casing element and a ball screw device arranged between the motor and the spindle for transferring a rotational movement from the motor into a longitudinal movement of the spindle.

5. A cavity filter according to claim 1, where the first casing element has a bottom hole and a step to receive a bearing in the form of a hollow sleeve that comprises the sliding surface.

6. A cavity filter according to claim 1, where the sliding surface is an integral surface on the first casing element.

7. A cavity filter according to claim 1, where the first casing element has a bottom hole for receiving a bearing rod that comprises the tongues and the spindle comprises the sliding surface.

8. A method for assembling a cavity filter according to claim 1, comprising the steps of:

arranging the sliding surface in a bottom hole in the first casing element;

arranging in the tube shaped first support against a step in the bottom hole;

arranging the dielectric resonator above the first support;

arranging a dielectric second support above the resonator;

fixing the second casing element to the first casing element in such a way that the second casing element is in contact with the second support;

inserting the spindle with the tuner through an opening in the second casing element after the second casing element has been fixed and thereafter bringing the spindle into contact with the sliding surface, where the spindle is mounted by means of at least two sprung tongues, each of which has a stud with an at least partially spherical free end, where at least two of the free ends are in contact with said sliding surface along which said spindle moves as said tuner moves in and out of said resonator.

9. A method according to claim 8, comprising the step of arranging a ball screw device on both the spindle and a motor, or of arranging a linear motor directly on the spindle, before the spindle is inserted through the opening and of arranging a bearing in the bottom hole, where the bearing comprises the sliding surface.

* * * * *